Patented Jan. 12, 1937

2,067,299

UNITED STATES PATENT OFFICE

2,067,299

RUBBER SOLUTION

Ira Williams, Woodstown, and Carroll Cummings Smith, Carneys Point, N. J., assignors to E. I. du Pont de Nemours & Company, Wilmington, Del., a corporation of Delaware No Drawing. Application September 11, 1935, Serial No. 40,090

24 Claims. (Cl. 134—17)

This invention relates to rubber solutions and more particularly to the production of rubber cements of high rubber content and/or low viscosity.

Rubber cements are usually prepared by stirring rubber into solvents such as petroleum spirits, benzene, carbon tetrachloride or the like until a homogeneous solution is obtained. The viscosity of the cements is usually controlled by the amount of rubber dissolved in the solvent and the amount of milling which the rubber receives before being dissolved. Excessive milling is harmful to the physical properties of the rubber and the degree of softening which can be obtained is limited even with a harmful period of milling.

It has also been proposed to reduce the viscosity of cements by the addition of various substances thereto. In U. S. Patent 1,916,421 it is suggested to reduce the viscosity of cements by the addition thereto of soap and desolvating agents, such as alcohols. U. S. Patent 1,909,219 and German Patent 585,405 suggest the use of nitric acid for reducing the viscosity of cements. These methods have not proved to be entirely satisfactory as it has not been possible to obtain a sufficient reduction in viscosity or the agents employed therein are objectionable for certain uses.

In our copending application, Ser. No. 741,824 filed on August 28, 1934, we have disclosed a method of reducing the viscosity of rubber solutions in organic solvents by the addition thereto of unsymmetrically substituted hydrazine compounds. Such compounds are extremely effective in reducing the viscosity of the rubber cement. However, these compounds appear to be somewhat less effective when the solvent employed comprises aliphatic hydrocarbons such as petroleum naphtha, gasolines and the like than they are when the solvent employed is an aromatic hydrocarbon or other organic solvent.

An object of the present invention is to provide a method of producing cements of greatly increased rubber content or greatly reduced viscosity where the solvent is an aliphatic hydrocarbon such as petroleum naphtha or gasoline. Another object is to provide a method for reducing the viscosity of rubber cements by means of unsymmetrically substituted hydrazine compounds, when an aliphatic hydrocarbon solvent is employed whereby the unsymmetrically substituted hydrazine compound will be rendered as effective in the presence of such solvent as they are in the presence of other solvents. A further object is to produce solutions of rubber in aliphatic hydrocarbon solvents of greatly reduced viscosity or greatly increased rubber content. Still further objects are to produce new compositions of matter and to advance the art. Still other objects will appear hereinafter.

These objects may be accomplished in accordance with our invention which comprises incorporating in a rubber solution in an aliphatic hydrocarbon solvent a small amount of an alcohol and an unsymmetrically substituted hydrazine compound. In the presence of the alcohol, the hydrazine compounds are as effective for reducing the viscosity of the solution as they are in other solvents in the absence of such alcohols.

As the solvents, the pure aliphatic hydrocarbons which are liquid at ordinary room temperatures such as hexane, heptane, octane, nonane, decane, dodecane, cyclohexane, hexylenes, heptylenes, octylenes, dodecylenes and the like or mixtures thereof may be employed. However, it is preferred to employ petroleum solvents such as straight-run and cracked gasolines and petroleum naphtha and our invention is particularly adapted to rubber solutions employing such solvents.

By the term "alcohol" we intend to include the polyhydric alcohols such as the glycols and glycerol as well as the monohydric alcohols, the unsaturated as well as the saturated alcohols, the branched chain as well as the straight chain and the substituted as well as the unsubstituted alcohols. In other words, the alcohol may contain 1 or more than 1 hydroxyl group and in addition may contain other groups such as ketone, ether, carboxyl and amino groups. However, the best results are obtained when the alcohol is soluble in the particular type of solvent used to the extent of at least 1%. In practice, it will be desired to employ the alcohols of 1-6 carbon atoms and, of these, the monohydric unsubstituted saturated alcohols such as methyl, ethyl, propyl, butyl, isobutyl and isoamyl alcohols appear to be most satisfactory, the methyl, ethyl and propyl alcohols being preferred. The alcohols will, in general, be employed in amounts of about 1 to about 10% of the solvent although larger or smaller amounts may be employed. In some cases it may be advantageous to employ as much as 20% of the alcohol based on the solvent.

The term "unsymmetrically substituted hydrazine compounds", as employed herein and in the claims, will be understood to mean those compounds having 2 nitrogens singly bonded together and containing at least 1 substituent on at least one nitrogen, the whole compound being unsymmetrical, taking such single bond between the nitrogens as the central point. Examples of such hydrazines are those in which only one nitrogen carries substituents; those in which there are two substituents on one nitrogen and only one substituent on the other; and those in which there is only one substituent on each nitrogen, the substituent on one N being basically different in character than that on the other nitrogen, thus, in the last case, if one substituent is aromatic, the other must be other than aromatic, for example, aliphatic or heterocyclic.

The term "unsymmetrically substituted hydrazine compounds" includes the salts and derivatives which still retain the hydrazine nucleus and character, as well as the free bases. Some of the hydrazines and their salts and derivatives which are suitable for our purpose are disclosed in our copending applications Ser. No. 730,914 filed June 16, 1934; Serial No. 733,967 filed July 6, 1934; Serial No. 741,824 filed August 28, 1934 and Serial No. 36,324 filed August 15, 1935. Preferably we employ compounds containing at the most 3 substituents and particularly those hydrazine compounds having at least one valence of at least one nitrogen of the hydrazine nucleus satisfied by a hydrogen atom and having at least one valence of at least one nitrogen of the hydrazine nucleus satisfied by a carbon atom of an organic group. Amongst the compounds which we have found to be most satisfactory for our purpose are phenyl hydrazine, p-tolyl hydrazine, triphenyl hydrazine, alpha naphthyl hydrazine hydrochloride and the addition product of 2 moles of phenyl hydrazine and 1 mole of zinc chloride.

Rubber cements containing these compounds have many advantages over the ordinary type. For example, when any one or a combination of our compounds is added to a rubber cement, the viscosity of the cement begins to decrease and continues to decrease at a gradually decreasing rate until an apparent equilibrium is reached, after which, little or no further decrease in the viscosity takes place. The length of time required to reach this equilibrium varies considerably for different compounds and depends largely upon the temperatures and the amount of agent employed. A beneficial decrease in viscosity will, in general, be noticed in periods of time which may vary from 15 minutes to two days. Further, the amount of the decrease in the viscosity, which will be obtained over a given length of time, will vary with the amount of hydrazine compound employed. However, the decrease in viscosity with increased amounts of hydrazine compound is not in proportion to the compound added. The amount of compound to be added may be varied within an extremely wide range depending upon the ingredients of the solution and the desire of the user. However, for economical reasons, it will generally be found that from about 0.1 to about 10% of the hydrazine compound based on the rubber in the solution will be sufficient for most purposes. In certain instances, it may be found advantageous to employ 10% or more of the compound based on the rubber in the cement to effect the desired decrease in viscosity.

The temperature to be employed depends upon the particular combination of solvent, hydrazine and alcohol employed, but will usually be between 10 and 90° C. In case volatile solvents are employed, the cement can be prepared in closed containers. In general the reduction in viscosity is accomplished in less time at higher temperatures and usually high temperatures produce somewhat less viscous cements.

In order to more clearly illustrate our invention, the preferred embodiments thereof, and the advantageous results to be obtained thereby, the following examples are given:

Example 1

Smoked sheet rubber was treated on the rubber mill with 1 percent of its weight of the addition product of 2 mols phenylhydrazine and 1 mol. zinc chloride and was then held for 18 hours at 70° C. 1000 grams of this rubber was dissolved in 5 liters of gasoline. 100 cc. portions of this cement were treated with 10 cc. of alcohol and the viscosity was measured by determining the time required for a steel ball to fall through a column of cement after the cement had stood at room temperature for 4 days. The results are shown in the following table:

| Alcohol added | Relative viscosity in seconds |
|---|---|
| None | 322 |
| Methyl | 115 |
| Ethyl | 63 |
| Butyl | 76 |
| Isopropyl | 38 |
| Isoamyl | 40 |
| Lauryl | 191 |
| Monoethylether of ethylene glycol | 30 |

Example 2

Various amounts of isopropyl alcohol were added to portions of the rubber solution used in Example 1. The viscosity was measured after the cement had stood for 3 days at 25° C. and for 3 days at 35° C. The results are shown in the following table.

| Cc. isopropyl alcohol added to 100 cc. cement | Relative viscosity in seconds after— | |
|---|---|---|
| | 3 days at 25° C. | 3 days at 35° C. |
| 0 | 322 | 217 |
| 1 | 120 | 52 |
| 3 | 46 | 23 |
| 5 | 38 | 17 |
| 7 | 35 | 11 |

Example 3

Very lightly milled rubber was used to compare the effectiveness of various hydrazines as thinning agents for gasoline cements in the presence and in the absence of ethyl alcohol. 10 grams of rubber were added to 100 cc. of either gasoline or gasoline containing 5 percent of ethyl alcohol and the peptizing agent was then introduced. The container was then closed and rotated slowly for 4 days to bring the rubber into solution. Viscosity was then measured with the results shown in the following table.

| Hydrazine added | Percent hydrazine based on weight of rubber | Viscosity in seconds | |
|---|---|---|---|
| | | Gasoline cement | Gasoline alcohol cement |
| None | 0.0 | 550 | 131 |
| Phenyl hydrazine | 1.0 | 246 | 51 |
| p-Tolyl hydrazine | 1.0 | 223 | 51 |
| Triphenyl hydrazine | 1.5 | 87 | 9 |
| α-Naphthyl hydrazine hydrochloride | 2.0 | | 4 |

Example 4

10 grams of lightly milled rubber were added to either gasoline or gasoline containing 5 percent of methyl alcohol and was rotated slowly in a closed container for two days at 25° C. and at 43° C. in the presence of 1 percent of hydrazine based on the rubber. The viscosity was then determined.

| Hydrazine added | Temperature used to prepare solution | Viscosity in seconds | |
|---|---|---|---|
| | | Gasoline cement | Gasoline-alcohol cement |
| Phenyl hydrazine | 25 | 217 | 59 |
| Phenyl hydrazine | 43 | 125 | 22 |
| p-Tolyl hydrazine | 25 | 247 | 55 |
| p-Tolyl hydrazine | 43 | 122 | 22 |

A wide variety of substituted hydrazines and salts or addition products of hydrazines have been found to be effective among which are:

Phenyl hydrazine
Phenyl hydrazine oxalate
o-Tolyl hydrazine
a-Naphthyl hydrazine
o-Xenyl hydrazine
Asymmetrical diphenyl hydrazine
2-5-dichlor phenyl hydrazine
Benzoyl derivative of phenyl hydrazine
m-Nitro phenyl hydrazine
p-Nitro phenyl hydrazine
Phenyl dithio carbazimic phenyl hydrazine
Methyl propyl ketone phenyl hydrazone
Phenol salt of phenyl hydrazine
a-Naphthol salt of phenyl hydrazine
Phenyl hydrazine $CO_2$ addition product
p-Tolyl hydrazine zinc chloride addition product
Cyclo penta methylene hydrazine
Asymmetrical di lauryl hydrazine
o-Tolyl hydrazine $SO_2$ addition product Also, the various compounds disclosed in our copending applications hereinbefore mentioned will be found to be effective and we intend to include such compounds within the scope of this invention.

In making cements in accordance with our invention, the hydrazine compounds may be added directly to the rubber prior to the solution of the rubber in the solvent. By this method the solution of the rubber in the solvent will be facilitated. If desired, the rubber may be first dissolved in the solvent and the hydrazine and alcohol added thereto. However, the preferred method will be to add the hydrazine and the alcohol to the solvent prior to the solution of the rubber therein as by this method the rate of solution of the rubber will be materially increased.

If desired, fillers may also be added to the rubber or to the cement. It has been found that certain substances, such as carbon black and sulfur, retard the solution of the rubber or thinning of the cement. In such cases, greater concentrations of the hydrazine compound may be required. However, it will usually be found advantageous to add the hydrazine to the cement and permit the viscosity to decrease to the desired point before adding such substances as carbon black and sulfur to the cement.

Various mixtures of the hydrazine compounds may also be employed if desired. For example, mixtures of a free base of the hydrazine and a salt of the free base may be added or the hydrazine may be added and later may be converted to the salt by addition of acid to the cement. In other cases, the hydrazine may be converted into reaction products in the cement. For example, phenyl hydrazine may be added to the cement and later converted to a hydrazone by treatment with aceto acetic ester. The resulting hydrazone will be a less active thinning agent and have less odor than phenyl hydrazine itself.

The cements produced by our process are useful for many purposes such as adhesives, impregnating materials, dipping or spreading cements, binders when mixed with wood flour, cork, cotton linters, wool, asbestos and similar materials or may be used for the preparation of rubber isomers or derivatives. The reduced viscosity permits a large amount of rubber to be held in the same volume of solvent which results, in many operations, in a considerable saving in solvent cost as well as in the operations themselves.

While we have disclosed the preferred embodiments of our invention and the preferred modes of carrying the same into effect, it will be readily apparent to those skilled in the art that many variations and modifications may be made therein without departing from the spirit of our invention. Accordingly, the scope of our invention is to be limited solely by the appended claims construed as broadly as is permissible in view of the prior art.

We claim:

1. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber in the presence of about 1 to about 10% of an alcohol based on the solvent, for a length of time sufficient to decrease its viscosity.

2. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber in the presence of about 1 to about 10% of an alcohol based on the solvent, for a length of time sufficient to decrease its viscosity prior to the addition of compounding ingredients.

3. The process of preparing a solution of unvulcanized rubber in an aliphatic hydrocarbon solvent which comprises dissolving the rubber in the solvent in the presence of about 1 to about 10% of an alcohol based on the solvent and about 0.1 to about 10% of an unsymmetrically substituted hydrazine compound based on the rubber.

4. The process of preparing a solution of unvulcanized rubber in an aliphatic hydrocarbon solvent which comprises dissolving the rubber in the solvent which contains about 1 to about 10% of an alcohol based on the solvent and about 0.1 to about 10% of an unsymmetrically substituted hydrazine compound based on the rubber.

5. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber in the presence of about 1 to about 10% of an unsubstituted alcohol of 1 to 6 carbon atoms based on the solvent, for a length of time sufficient to decrease its viscosity.

6. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber in the presence of about 1 to about 10% of a monohydric unsubstituted saturated alcohol of 1 to 6 carbon atoms based on the solvent, for a length of time sufficient to decrease its viscosity.

7. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber, said compound containing at the most 3 substituents, each substituent comprising an organic group having a carbon atom thereof bonded directly to a nitrogen of the hydrazine nucleus, in the presence of about 1 to about 10% of an alcohol based on the solvent, for a length of time sufficient to decrease its viscosity.

8. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of an alcohol based on the solvent, for a length of time sufficient to decrease its viscosity.

9. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of a saturated alcohol of 1 to 6 carbon atoms, based on the solvent, for a length of time sufficient to decrease its viscosity.

10. The method of reducing the viscosity of solutions of unvulcanized rubber in an aliphatic hydrocarbon solvent which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of a monohydric unsubstituted saturated alcohol of 1 to 6 carbon atoms based on the solvent, for a length of time sufficient to decrease its viscosity.

11. The method of reducing the viscosity of solutions of unvulcanized rubber in a petroleum solvent which comprises the step of subjecting the rubber to the action of about 0.1 to about 10% of an unsymmetrically substituted hydrazine compound based on the rubber in the presence of about 1 to about 10% of an alcohol based on the solvent, for a length of time sufficient to decrease its viscosity.

12. The method of reducing the viscosity of solutions of unvulcanized rubber in gasoline which comprises the step of subjecting the rubber to the action of about 0.1 to about 10% of an unsymmetrically substituted hydrazine compound based on the rubber in the presence of about 1 to about 10% of an alcohol based on the solvent, for a length of time sufficient to decrease its viscosity.

13. The method of reducing the viscosity of solutions of unvulcanized rubber in gasoline which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of an alcohol based on the solvent, for a length of time sufficient to decrease its viscosity.

14. The method of reducing the viscosity of solutions of unvulcanized rubber in gasoline which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of a saturated alcohol of 1 to 6 carbon atoms based on the solvent, for a length of time sufficient to decrease its viscosity.

15. The method of reducing the viscosity of solutions of unvulcanized rubber in gasoline which comprises the step of subjecting the rubber to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of a monohydric unsubstituted saturated alcohol of 1 to 6 carbon atoms based on the solvent, for a length of time sufficient to decrease its viscosity.

16. Solutions of unvulcanized rubber in an aliphatic hydrocarbon solvent wherein the rubber has been subjected to the action of about 0.1 to about 10% of an unsymmetrically substituted hydrazine compound based on the rubber in the presence of about 1 to about 10% of an alcohol based on the solvent, for a length of time sufficient to decrease its viscosity.

17. Solutions of unvulcanized rubber in an aliphatic hydrocarbon solvent wherein the rubber has been subjected to the action of about 0.1 to about 10% of an unsymmetrically substituted hydrazine compound based on the rubber in the presence of about 1 to about 10% of a mono-hydric unsubstituted saturated alcohol of 1 to 6 carbon atoms based on the solvent, for a length of time sufficient to decrease its viscosity.

18. Solutions of unvulcanized rubber in an aliphatic hydrocarbon solvent wherein the rubber has been subjected to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of an alcohol based on the solvent, for a length of time sufficient to decrease its viscosity.

19. Solutions of unvulcanized rubber in an aliphatic hydrocarbon solvent wherein the rubber has been subjected to the action of about 0.1 to about 10% of an unsymmetrically substituted hydrazine compound based on the rubber, said compound having at least one valence of at least one nitrogen of the hydrazine nucleus satisfied by a hydrogen atom and having at least one valence of at least one nitrogen of the hydrazine nucleus satisfied by a carbon atom of an organic group, in the presence of about 1 to about 10% of a monohydric unsubstituted saturated alcohol of 1 to 6 carbon atoms based on the solvent, for a length of time sufficient to decrease its viscosity.

20. The method of reducing the viscosity of solutions of unvulcanized rubber in gasoline which comprises the step of subjecting the rubber to the action of about 0.1% to about 10% of an unsymmetrically substituted hydrazine compound based on the rubber in the presence of about 1% to about 10% of ethyl alcohol based on the solvent, for a length of time sufficient to decrease its viscosity.

21. The method of reducing the viscosity of solutions of unvulcanized rubber in gasoline which comprises the step of subjecting the rubber to the action of about 0.1% to about 10% of phenyl hydrazine based on the rubber in the presence of about 1% to about 10% of an alcohol based on the solvent, for a length of time sufficient to decrease its viscosity.

22. The method of reducing the viscosity of solutions of unvulcanized rubber in gasoline which comprises the step of subjecting the rubber to the action of about 0.1% to about 10% of phenyl hydrazine based on the rubber in the presence of about 1% to about 10% of ethyl alcohol based on the solvent, for a length of time sufficient to decrease its viscosity.

23. The method of reducing the viscosity of solutions of unvulcanized rubber in gasoline which comprises the step of subjecting the rubber to the action of about 0.1% to about 10% of the addition product of 2 mols of phenyl hydrazine and 1 mol. of zinc chloride based on the rubber in the presence of about 1% to about 10% of ethyl alcohol based on the solvent, for a length of time sufficient to decrease its viscosity.

24. The method of reducing the viscosity of solutions of unvulcanized rubber in gasoline which comprises the step of subjecting the rubber to the action of about 0.1% to about 10% of phenyl hydrazine based on the rubber in the presence of about 1% to about 10% of methyl alcohol based on the solvent, for a length of time sufficient to decrease its viscosity.

IRA WILLIAMS.
CARROLL CUMMINGS SMITH.